United States Patent
Fu et al.

(10) Patent No.: US 11,140,407 B2
(45) Date of Patent: Oct. 5, 2021

(54) FRAME BOUNDARY ARTIFACTS REMOVAL

(71) Applicant: Apple Inc., Cupertino, CA (US)

(72) Inventors: Xiang Fu, Mountain View, CA (US);
Xiaohua Yang, San Jose, CA (US);
Linfeng Guo, Cupertino, CA (US);
Francesco Iacopino, San Jose, CA (US);
Felix Chou, Saratoga, CA (US);
Ying Jian He, San Jose, CA (US)

( * ) Notice: Subject to any disclaimer, the term of this patent is extended or adjusted under 35 U.S.C. 154(b) by 0 days.

(21) Appl. No.: 16/222,254

(22) Filed: Dec. 17, 2018

(65) Prior Publication Data
US 2019/0246135 A1    Aug. 8, 2019

Related U.S. Application Data

(60) Provisional application No. 62/628,211, filed on Feb. 8, 2018.

(51) Int. Cl.
| | |
|---|---|
| *H04N 19/172* | (2014.01) |
| *H04N 19/52* | (2014.01) |
| *H04N 19/176* | (2014.01) |
| *H04N 19/182* | (2014.01) |
| *H04N 19/55* | (2014.01) |
| *H04N 19/167* | (2014.01) |
| *H04N 19/119* | (2014.01) |

(52) U.S. Cl.
CPC ........... *H04N 19/52* (2014.11); *H04N 19/119* (2014.11); *H04N 19/167* (2014.11); *H04N 19/172* (2014.11); *H04N 19/176* (2014.11); *H04N 19/182* (2014.11); *H04N 19/55* (2014.11)

(58) Field of Classification Search
CPC .. H04N 19/172; H04N 19/176; H04N 19/182; H04N 19/52
See application file for complete search history.

(56) References Cited

U.S. PATENT DOCUMENTS

| | | | | |
|---|---|---|---|---|
| 2009/0268823 | A1* | 10/2009 | Dane | H04N 19/132 375/240.27 |
| 2010/0086052 | A1* | 4/2010 | Park | H04N 19/46 375/240.16 |
| 2014/0056353 | A1* | 2/2014 | Yu | H04N 19/147 375/240.15 |
| 2014/0369428 | A1* | 12/2014 | Park | H04N 19/82 375/240.29 |
| 2015/0326875 | A1* | 11/2015 | Chen | H04N 19/59 375/240.16 |

* cited by examiner

*Primary Examiner* — Dave Czekaj
*Assistant Examiner* — Berteau Joisil
(74) *Attorney, Agent, or Firm* — BakerHostetler

(57) ABSTRACT

Techniques for encoding video with reduced frame-boundary artifacts are presented. The techniques include a video encoding method, where, when skip mode is selected as a motion prediction coding mode for a pixel block predicted from a reference block of a reference frame, estimating an amount of the reference block that extends beyond the edge of the reference frame. If the amount beyond the edge does not exceed a threshold, the prediction may be coded with skip mode. If the amount beyond the edge exceeds a threshold, the pixel block may be partitioned, and the partitioned blocks may be coded with motion prediction.

22 Claims, 6 Drawing Sheets

400

FRAME BOUNDARY ARTIFACTS REMOVAL

CROSS REFERENCE TO RELATED APPLICATIONS

This application claims benefit under 35 U.S.C. § 119(e) of Provisional U.S. patent application No. 62/628,211, filed Feb. 8, 2018, the contents of which are incorporated herein by reference in their entirety.

BACKGROUND

Video compression is widely used in video capture, video storage, real-time video communication, or video transcoding applications. Examples of popular applications contain Apple's iPhone/iPad video capture, FaceTime, and Apple's Airplay Mirroring. In traditional block-based video coding, such as Advanced Video Coding (AVC) and High Efficiency Video Coding (HEVC), each frame is divided into square blocks of different pixel sizes called macroblocks (MB) or Coding Tree Unit (CTU). For each MB or CTU, and encoder can choose amongst different coding modes to optimize coding quality by simultaneously maximizing decoded visual quality while minimizing encoded bitrate. This may be done, for example, by maximizing visual quality under the constraint of a target bitrate.

DETAILED DESCRIPTION

Motion predictive video coding generally includes coding portions of an input frame, called "pixel blocks" for convenience, with an indication of a reference frame, indicating a previously-coded frame that serves as a prediction reference for the pixel block being coded; a motion vector, indicating a location of pixels within the indicated reference frame that provide prediction for the pixel block; and optionally a residual, indicating errors of the prediction.

There are several modes of motion compensated coding, including intra mode, inter mode, and skip mode. Intra mode exploits spatial redundancy in image data by encoding a pixel block based on previously-coded content from the same frame in which in input pixel block resides. Inter mode exploits temporal redundancy in image data by encoding a pixel block with reference to image data from a previously-coded frame (or frames). In intra mode or inter mode, in addition to encoding a motion prediction vector, a residual indicating an error in the prediction may be encoded. In skip mode, a pixel block is encoded using pixels from a previous or future displayed frame, but without explicitly encoding prediction residual errors and motion vectors. In skip mode prediction, a decoder will infer the motion vector of skip mode coded pixel blocks from other pixel blocks that have already been decoded, and thus the number of bits required to encode skip mode may be much lower than the number of bits required to encode in either intra or inter mode. There may be restrictions on which motion coding modes can be used. For example with HEVC and AVC, an encoder can only choose intra mode for a MB or CTU in an I-slice, while the encoder can choose intra, inter or skip mode for a MB or CTU in a P- or B-slice.

Figure 1:
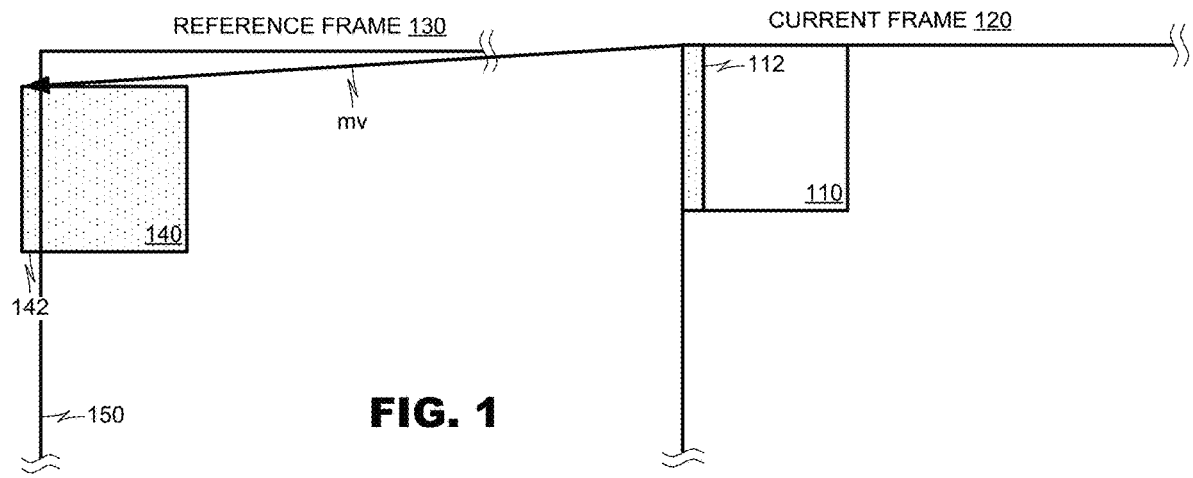
FIG. 1 illustrates an example motion prediction technique that may cause image artifacts.

When predictions are made according to inter coding modes or skip coding modes, it can occur that motion vectors refer to elements from a reference frame that are not contained entirety within the reference frame's image space. One such example is illustrated in FIG. 1. There, a pixel block 110 from a current input frame 120 may be coded predictively with reference to content from a reference frame 130. A motion vector my may be established for the pixel block 110 that points to a region 140 of the reference frame 130 that extends past an edge 150 of the reference frame 130. Thus, when a prediction block is formed from the region 140, the prediction block will not have image data from a portion 142 thereof. There will be no prediction data in a portion 112 of the pixel block 110 that is to be coded.

Many modern coding protocols include mechanisms to interpolate image content in such cases. For example, in HEVC and AVC, prediction operations may generate image content for such regions 112/142 by replicating the image content along the edge 150 of a reference frame 130. Such operations, however, can generate visual artifacts in the case of skip mode coding. For skip mode coding, decoders interpolate motion vectors of pixel blocks from motion vectors of co-located pixel blocks in previously-coded frames. Moreover, skip mode coding does not provide opportunities for an encoder to provide residual information, which can correct image errors that can arise from interpolation of image content. Further, skip mode coding tends to be used repeatedly over frames that exhibit low motion content, which can cause interpolated content to appear as "smears" over a significant enough span of consecutively skip coded pixel blocks.

Figure 2:
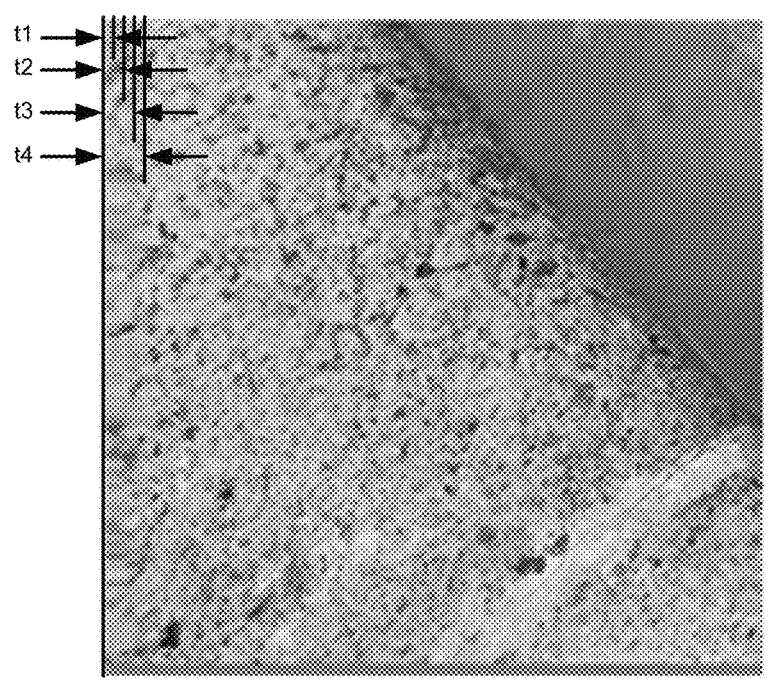
FIG. 2 illustrates an example image with coding image artifacts.

FIG. 2 illustrates an example of the image artifacts that can arise from skip mode coding and interpolation. In FIG. 2, a range of pixels 210 is shown having content that is interpolated from an edge of a source image. These interpolated pixels may have been generated over the course of a series of skip coded pixel blocks. For example, FIG. 2 illustrates widths of the range 210 that may have existed at times $t_1$, $t_2$, $t_3$, and $t_4$, respectively. When presented to a viewer over a video sequence, the "smeared" image content may be perceived as an image artifact.

Aspects of the present disclosure provide video coding techniques that avoid image artifacts that can arise from interpolation of image content from edges of reference frames. For example, responsive to selection of skip mode coding that uses content from an edge of a reference frame, an encoder may estimate an amount of the reference block that extends beyond edge of the reference frame. When the amount of prediction block does not exceed a threshold, the encoder may proceed with coding the pixel block by skip mode coding. When the amount of prediction block exceeds a threshold, however, an encoder may partition the pixel block into sub-blocks and perform a coding mode selection process anew. Oftentimes, some of the sub-blocks will be coded by skip mode coding using prediction references that are contained within the image space of the reference frame that originally was selected. For these sub-blocks, coding efficiency can be achieved. When prediction mode selection is performed for other sub-blocks that corresponded initially to a region of null image content from the reference frame, the prediction mode selection may select different prediction references through its ordinary operation, owing to increased distortion that may be detected. In an embodiment, the prediction mode selection may include bias that favors other coding modes over selection of the skip mode.

Figure 3A:
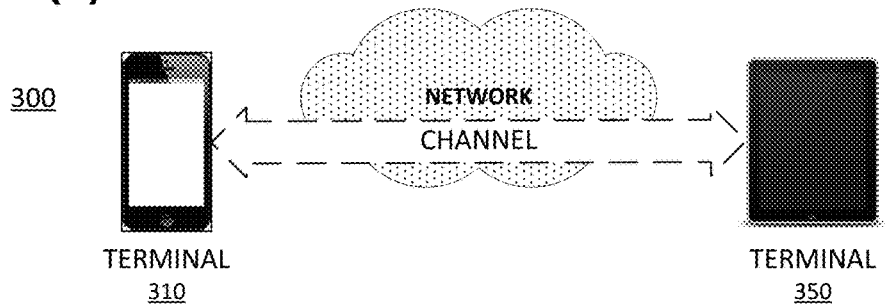
FIG. 3(a) is a simplified block diagram of a video delivery system according to an aspect of the present disclosure.

FIG. 3(a) is a simplified block diagram of an example video delivery system 300 according to an aspect of the present disclosure. The system 300 may include a plurality of terminals 310, 350 interconnected via a network. The terminals 310, 350 may code video data for transmission to their counterparts via the network. Thus, a first terminal 310 may capture video data locally, code the video data, and transmit the coded video data to the counterpart terminal 350 via a channel. The receiving terminal 350 may receive the coded video data, decode it, and render it locally, for example, on a display at the terminal 350. If the terminals are engaged in bidirectional exchange of video data, then the terminal 350 may capture video data locally, code the video data, and transmit the coded video data to the counterpart terminal 310 via another channel. The receiving terminal 310 may receive the coded video data transmitted from terminal 350, decode it, and render it locally, for example, on its own display.

A video coding system 300 may be used in a variety of applications. In a first application, the terminals 310, 350 may support real time bidirectional exchange of coded video to establish a video conferencing session between them. In another application, a terminal 310 may code pre-produced video (for example, television or movie programming) and store the coded video for delivery to one or, often, many downloading clients (e.g., terminal 350). Thus, the video being coded may be live or pre-produced, and the terminal 310 may act as a media server, delivering the coded video according to a one-to-one or a one-to-many distribution model. For the purposes of the present discussion, the type of video and the video distribution schemes are immaterial unless otherwise noted.

In FIG. 3(a), the terminals 310, 350 are illustrated as smart phones and tablet computers, respectively, but the principles of the present disclosure are not so limited. Aspects of the present disclosure also find application with computers (both desktop and laptop computers), computer servers, media players, dedicated video conferencing equipment, and/or dedicated video encoding equipment. Aspects may be performed by instructions stored in memory and executed on computer processors, and they may be performed by special-purpose hardware.

The network represents any number of networks that convey coded video data between the terminals 310, 350, including, for example, wireline and/or wireless communication networks. The communication network may exchange data in circuit-switched or packet-switched channels. Representative networks include telecommunications networks, local area networks, wide area networks, and/or the Internet. For the purposes of the present discussion, the architecture and topology of the network are immaterial to the operation of the present disclosure unless otherwise noted.

Figure 3B:
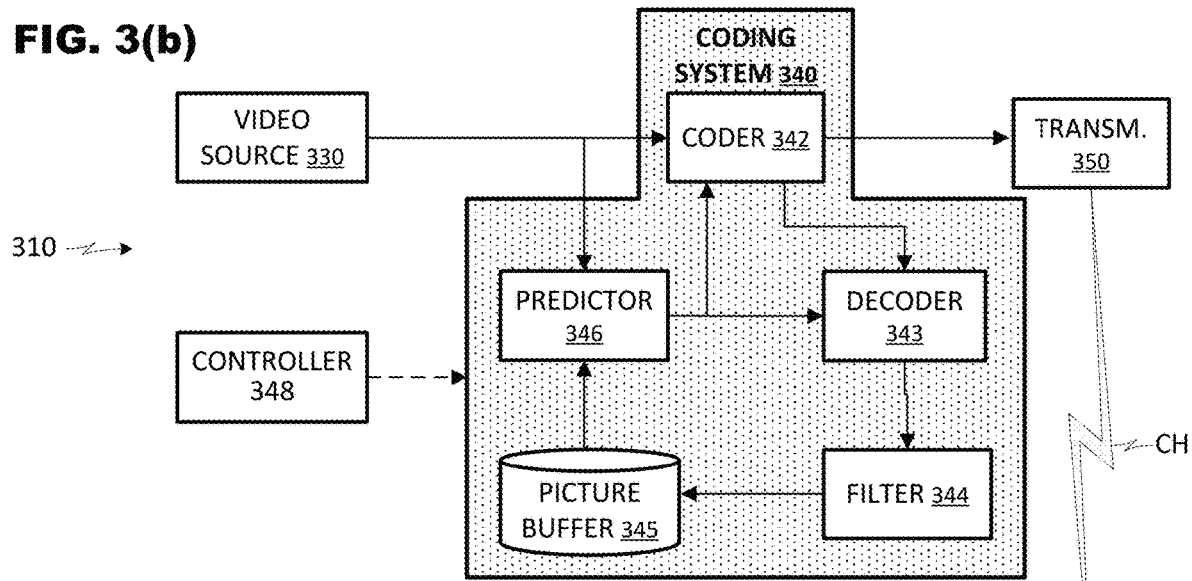
FIG. 3(b) is a functional block diagram illustrating components of an encoding terminal according to an aspect of the present disclosure.

FIG. 3(b) is an example functional block diagram illustrating components of an encoding terminal 310. The encoding terminal may include a video source 330, a coding system 340, controller 338 and a transmitter 350. The video source 330 may supply video to be coded. The video source 330 may be provided as a camera that captures image data of a local environment or a storage device that stores video from some other source.

The coding system 340 may perform coding operations on the video to reduce its bandwidth. Typically, the coding system 340 exploits temporal and/or spatial redundancies within the source video. For example, the coding system 340 may perform motion compensated predictive coding in which video frame or field pictures are parsed into sub-units (called "pixel blocks" for convenience), and individual pixel blocks are coded differentially with respect to predicted pixel blocks, which are derived from previously-coded video data. A given pixel block may be coded according to any one of a variety of predictive coding modes, such as: intra-coding, in which an input pixel block is coded differentially with respect to previously coded/decoded data of a common frame; single prediction inter-coding, in which an input pixel block is coded differentially with respect to data of a previously coded/decoded frame; bi-predictive inter-coding, in which an input pixel block is coded differentially with respect to data of a pair of previously coded/decoded frames; combined inter-intra coding, in which an input pixel block is coded differentially with respect to data from both a previously coded/decoded frame and data from the current/common frame; and multi-hypothesis inter-intra coding, in which an input pixel block is coded differentially with respect to data from several previously coded/decoded frames, as well as potentially data from the current/common frame. Pixel blocks also may be coded according to other coding modes. Any of these coding modes may induce visual artifacts in decoded images. Artifacts such as banding or ringing artifacts, and artifacts at edges in the pixel data may be particularly noticeable to the human visual system, and such artifacts may be mitigated with SAO filtering.

The coding system 340 may include a coder 342, a decoder 343, an in-loop filter 344, a picture buffer 345, and a predictor 346. The coder 342 may apply the differential coding techniques to the input pixel block using predicted pixel block data supplied by the predictor 346. The decoder 343 may invert the differential coding techniques applied by the coder 342 to a subset of coded frames designated as reference frames. The in-loop filter 344 may apply filtering techniques, including deblocking filtering, to the reconstructed reference frames generated by the decoder 343. The picture buffer 345 may store the reconstructed reference frames for use in prediction operations. The predictor 346 may predict data for input pixel blocks from within the reference frames stored in the picture buffer.

The transmitter 350 may transmit coded video data to a decoding terminal via a channel CH.

Figure 3C:
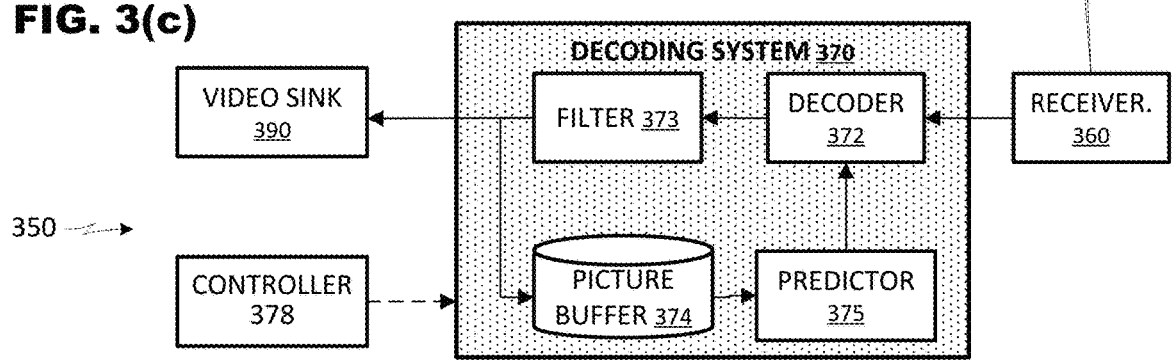
FIG. 3(c) is a functional block diagram illustrating components of a decoding terminal according to an aspect of the present disclosure.

FIG. 3(c) is an example functional block diagram illustrating components of a decoding terminal 350. The decoding terminal may include a receiver 360 to receive coded video data from the channel, a video decoding system 370 that decodes coded data, a controller 378, and a video sink 390 that consumes the video data.

The receiver 360 may receive a data stream from the network and may route components of the data stream to appropriate units within the terminal 200. Although FIGS.

3(b) and 3(c) illustrate functional units for video coding and decoding, terminals 310, 320 typically will include coding/decoding systems for audio data associated with the video and perhaps other processing units (not shown). Thus, the receiver 360 may parse the coded video data from other elements of the data stream and route it to the video decoder 370.

The video decoder 370 may perform decoding operations that invert coding operations performed by the coding system 340. The video decoder may include a decoder 372, an in-loop filter 373, a picture buffer 374, and a predictor 375. The decoder 372 may invert the differential coding techniques applied by the coder 342 to the coded frames. The in-loop filter 344 may apply filtering techniques, including deblocking filtering, to reconstructed frame data generated by the decoder 372. For example, the in-loop filter 344 may perform various filtering operations (e.g., de-blocking, de-ringing filtering, sample adaptive offset processing, and the like). The filtered frame data may be output from the decoding system. The picture buffer 374 may store reconstructed reference frames for use in prediction operations. The predictor 375 may predict data for input pixel blocks from within the reference frames stored by the picture buffer according to prediction reference data provided in the coded video data.

The video sink 390 represents various hardware and/or software components in a decoding terminal that may consume the reconstructed video. The video sink 390 typically may include one or more display devices on which reconstructed video may be rendered. Alternatively, the video sink 390 may be represented by a memory system that stores the reconstructed video for later use. The video sink 390 also may include one or more application programs that process the reconstructed video data according to controls provided in the application program. In some aspects, the video sink may represent a transmission system that transmits the reconstructed video to a display on another device, separate from the decoding terminal. For example, reconstructed video generated by a notebook computer may be transmitted to a large flat panel display for viewing.

The foregoing discussion of the encoding terminal and the decoding terminal (FIGS. 3(b) and 3(c)) illustrates operations that are performed to code and decode video data in a single direction between terminals, such as from terminal 310 to terminal 350 (FIG. 3(a)). In applications where bidirectional exchange of video is to be performed between the terminals 310, 350, each terminal 310, 350 will possess the functional units associated with an encoding terminal (FIG. 3(b)) and each terminal 310, 350 also will possess the functional units associated with a decoding terminal (FIG. 3(c)). Indeed, in certain applications, terminals 310, 350 may exchange multiple streams of coded video in a single direction, in which case, a single terminal (say terminal 310) will have multiple instances of an encoding terminal (FIG. 3(b)) provided therein. Such implementations, although not illustrated in FIG. 3, are fully consistent with the present discussion.

Figure 4:
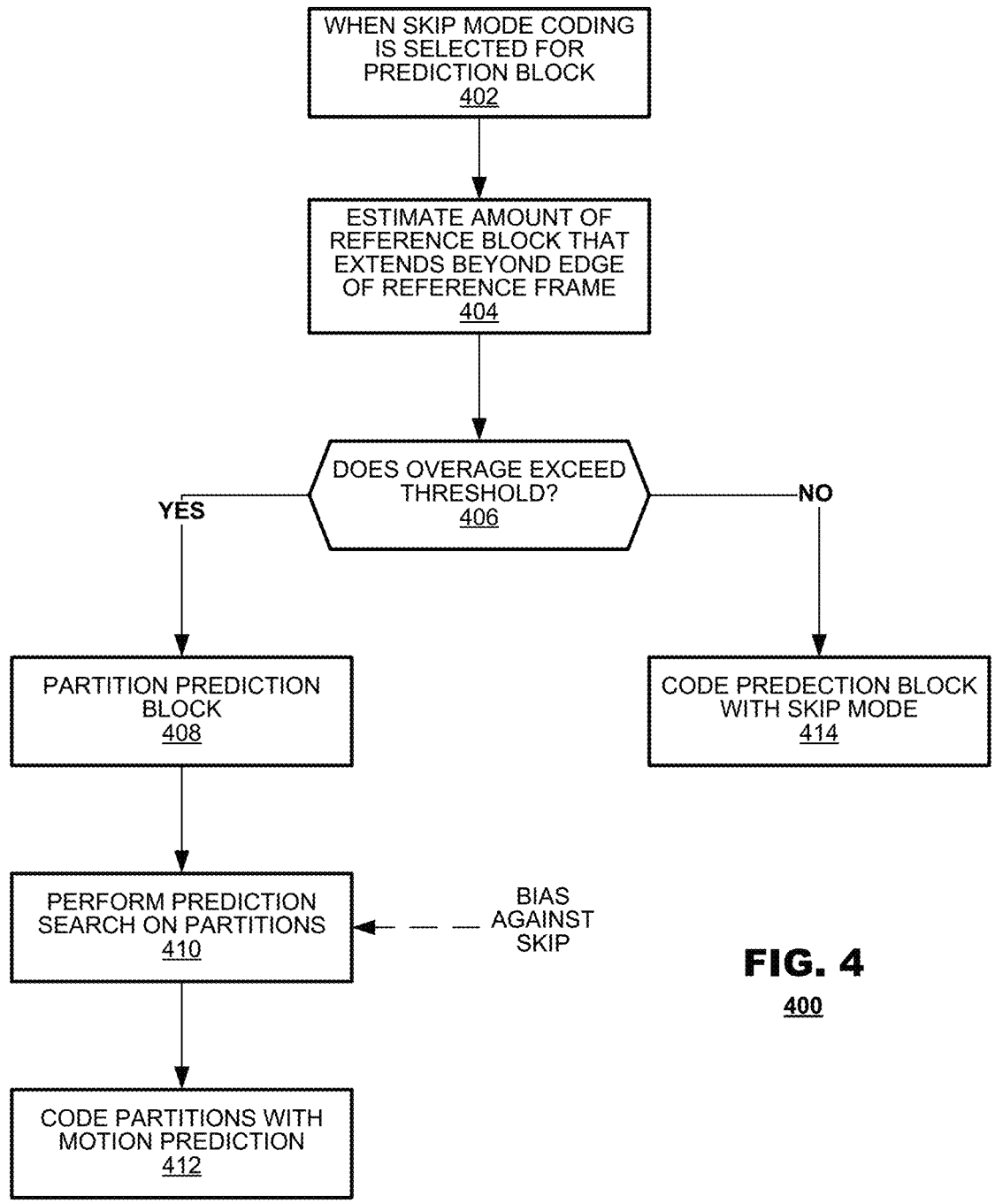
FIG. 4 illustrates a video coding method according to an aspect of the present disclosure.

FIG. 4 illustrates a method 400 according to an aspect of the present disclosure, and may be performed, for example, by the terminal 310 of FIG. 3(b). The method 400 may begin when skip mode is selected as the prediction coding mode for a prediction block (box 402, 348). The method 400 may estimate an amount that a reference block referenced by the selected prediction block extends beyond the edge of a reference frame (box 404, 348). The method 400 may compare the overage amount to a threshold (box 406, 348). If the overage does not exceed a threshold, the method 400 original prediction block may be coded with skip mode (box 414, 340).

If the method 400 determines at box 406 that the overage exceeds a threshold, the method 400 may partition the input pixel block (box 408, 348) and perform new motion prediction searches for each of the sub-blocks generated by the partitioning (box 410, 346). The method 400 may code the sub-blocks according to prediction modes generated for them as box 410 (box 412, 342).

Figure 5:
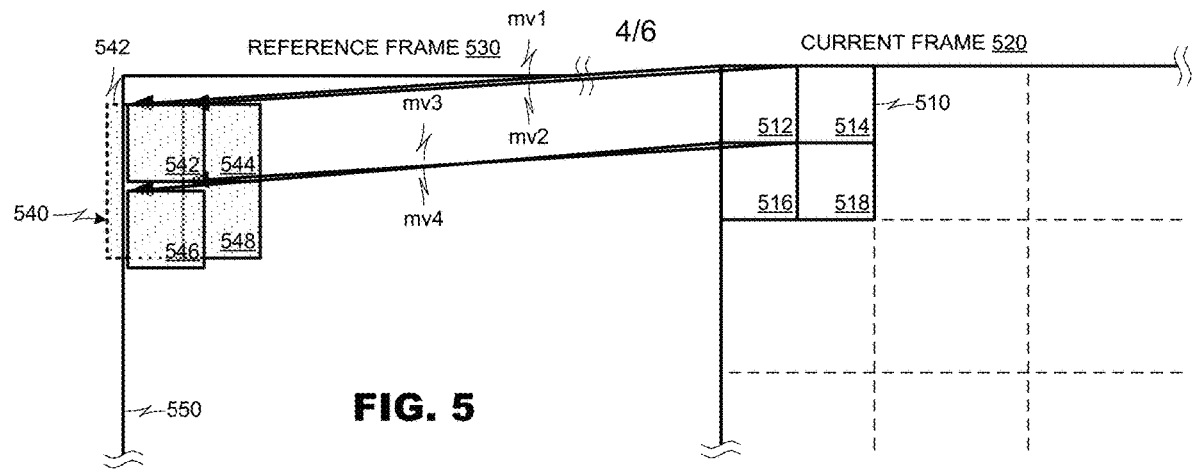
FIG. 5 illustrates a motion prediction technique according to an aspect of the present disclosure.

FIG. 5 illustrates operation of the method 400 of FIG. 4 as applied to the coding scenario of FIG. 1. At box 402, skip mode coding may have been assigned to a pixel block 510 of a current frame 520, which references a portion 540 from a reference frame 530. As in the scenario of FIG. 1, the portion extends beyond an edge 550 of the reference frame.

At box 406, the method 400 may determine that the amount of the reference block 540 that extends beyond the edge 550 of the reference frame 530 exceeds a threshold. In response, the method 400 may partition the input pixel block 510 into sub-blocks 512-518. The method 400 may perform new prediction mode selections for each of the sub-blocks 512-518. For sub-blocks 514 and 518, it is likely that skip mode selections will be assigned, using corresponding portions 544 and 548 from the reference frame 530.

It may occur that the new prediction mode selections (box 410) will result in different predictions being assigned to sub-blocks 512, 516 than the portion of pixel block 540 that would have been used under the initial skip mode assignment. As discussed below, prediction mode selection typically is made based on rate-distortion optimizations. As compared to distortion estimates that would be obtained from comparison of pixel block 510 and reference block 540 at a larger pixel block size, the distortion estimates that are obtained from a comparison of the smaller sub-block 512 and a corresponding portion of reference block 540 likely will exhibit higher distortion, owing to the null image content that is supplied by the region 542 beyond the edge 550 of the reference frame. Similarly, higher distortion estimates likely will be obtained from a comparison of the sub-block 516 and its counterpart portion of the original reference block 540. In this regard, motion prediction selections likely will cause different content elements to be selected as prediction references. The example of FIG. 5, for example, illustrates portions 542 and 546 being selected as prediction blocks, respectively, for the sub-blocks 512 and 516.

In a further aspect, rate-distortion optimization processes may be altered to bias the prediction mode selection processes of smaller sub-blocks (box 410) away from skip mode coding. Rate-distortion optimization refers to joint optimization process, which balances the bitrate required to encode video under various candidate coding modes and the amount of distortion that each mode induces. It solves the problem by a video quality metric, measuring both the visual quality distortion (the deviation from the source material) and the encoded data size (the bit cost for each possible decision outcome).

Each mode has an associated Rate-Distortion cost as below. The encoder may perform a mode decision to select a mode that leads to the minimum RD cost.

$$J_{opt} = \min_{i \in I_{mode}} \{D_i + \lambda_i R_i\},$$

where
$D_i$ represents a quality distortion for a particular mode; $R_i$ represents a bit cost for a particular mode; $I_{mode}$ represents the candidates coding modes (e.g., intra mode, inter mode, and skip mode); and $\lambda_i$ is a Lagrangian multiplier, which represents a relationship between bit cost and quality for a particular quality level in coding mode i. In practice, a given coding mode might be excluded from the rate-distortion estimation process if its coding rate $R_i$ exceeds a budgetary rate cap (e.g., $R_i > R_{budget}$).

The visual quality distortion $D_i$ may be measured between the pixel block being coded and a prediction block associated with the candidate coding mode. For example, distortion may be measured as the mean squared error or mean absolute error in order to maximize the video quality from a peak signal-to-noise ratio (PSNR) perspective. As discussed, when distortion estimates generated for sub-blocks after partitioning (e.g., block 512), skip mode coding distortion estimates likely will be higher as compared to distortion estimates run at larger pixel block sizes owing to a relatively higher contribution of null image data from a reference frame (region 542).

In an aspect, computation of rate distortion estimates in box 410 may be biased against selection of skip mode coding by assigning weights to the distortion estimates as follows:

$$J_{opt} = \min_{i \in I_{mode}} \{\alpha_i(D_i + \lambda_i R_i)\},$$

where $\alpha_i$ represents a weighting factor that scales rate-distortion cost for the skip mode as compared to other candidate modes (e.g., $\alpha_i > 1$ for skip mode coding but $\alpha_i = 1$ for all other modes). In this manner, rate-distortion estimates may be biased against skip mode coding when prediction mode selections are made in box 410.

In a further aspect, anti-skip mode biases may be limited to those sub-blocks that correspond initially to regions of a reference frame that have null image data. Returning to FIG. 5, anti-skip mode bias might be applied when selecting prediction modes for sub-blocks 512 and 516. Although permissible, it may not be necessary to apply an anti-skip mode bias when selecting prediction modes for sub-blocks 514, 518. In the example of FIG. 5, when skip mode coding initially selected prediction block 540 for coding the input pixel block 510, the portions corresponding to sub-blocks 514 and 518 did not involve a region 542 of null image content.

Figure 6:
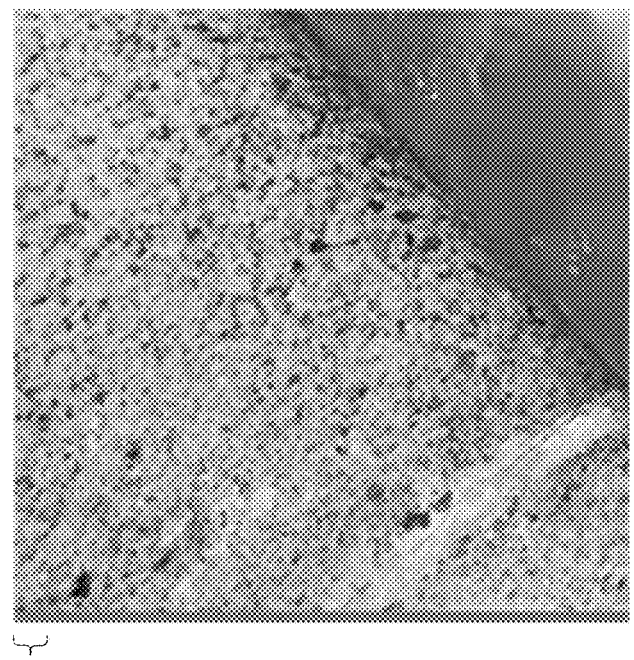
FIG. 6 illustrates an exemplary image that may be recovered from a video coding technique as in FIG. 4.

FIG. 6 illustrates an exemplary image that may be recovered after having been coded by the method 400 of FIG. 4, then decoded. As illustrated, the image 600 does not exhibit smear artifacts in an edge region 610 that were exhibited in FIG. 2.

Figure 7:
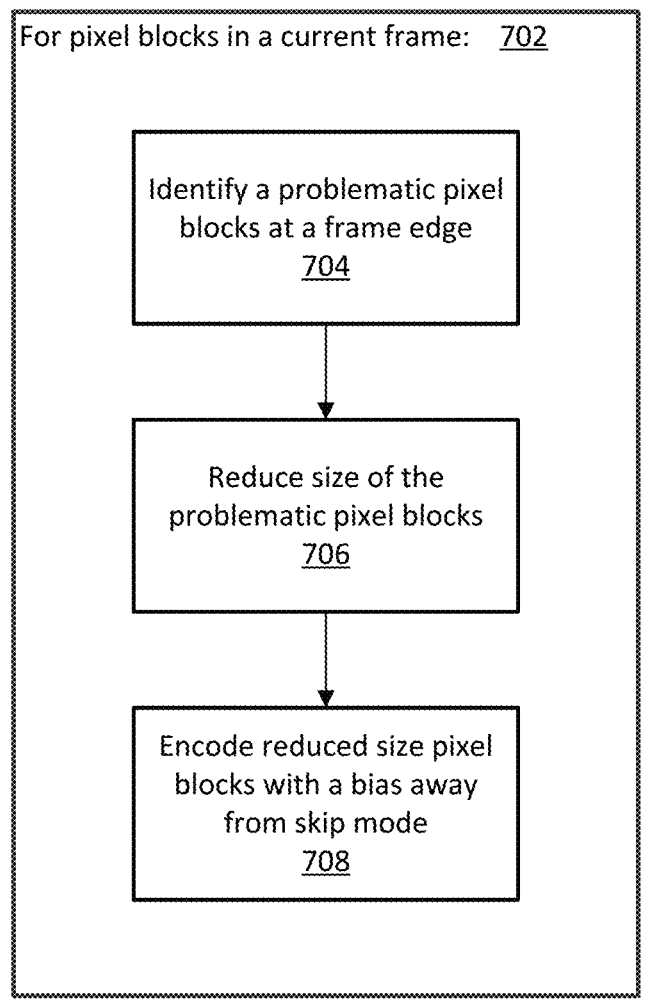
FIG. 7 illustrates a method for video coding according to an aspect of the present disclosure.

FIG. 7 is flowchart of a summary example method for improved video coding, and may be performed, for example, by the terminal 310 of FIG. 3(b). For pixel blocks in a current frame (702), a controller, such as controller 348 of FIG. 3(b), may identify problematic pixel blocks at an edge of the current frame (704). The identified problematic pixel blocks may be reduced in size (706). An encoder, such as coder 342, may code the reduced size pixel blocks with a bias away from skip mode (708).

Pixel blocks at an edge may include any pixel blocks that include one or more pixels that are at or along the frame boundary. Problematic pixel blocks may include, for example, blocks with estimated motion that is close to static, or blocks where a prediction reference refers to an area outside a reference frame boundary. A close-to-static pixel block may be a pixel block with small but non-zero magnitude of estimated motion. In comparison, a large estimated motion may be, for example, motion that is greater than the width of the pixel block. Fully static pixel blocks, where a motion estimate indicates either no motion at all or no motion in a direction perpendicular to a frame edge. Reduced size pixel blocks may be encoded with a bias away from skip mode, for example as a bias toward inter prediction mode or a bias away from skip mode.

Figure 8:
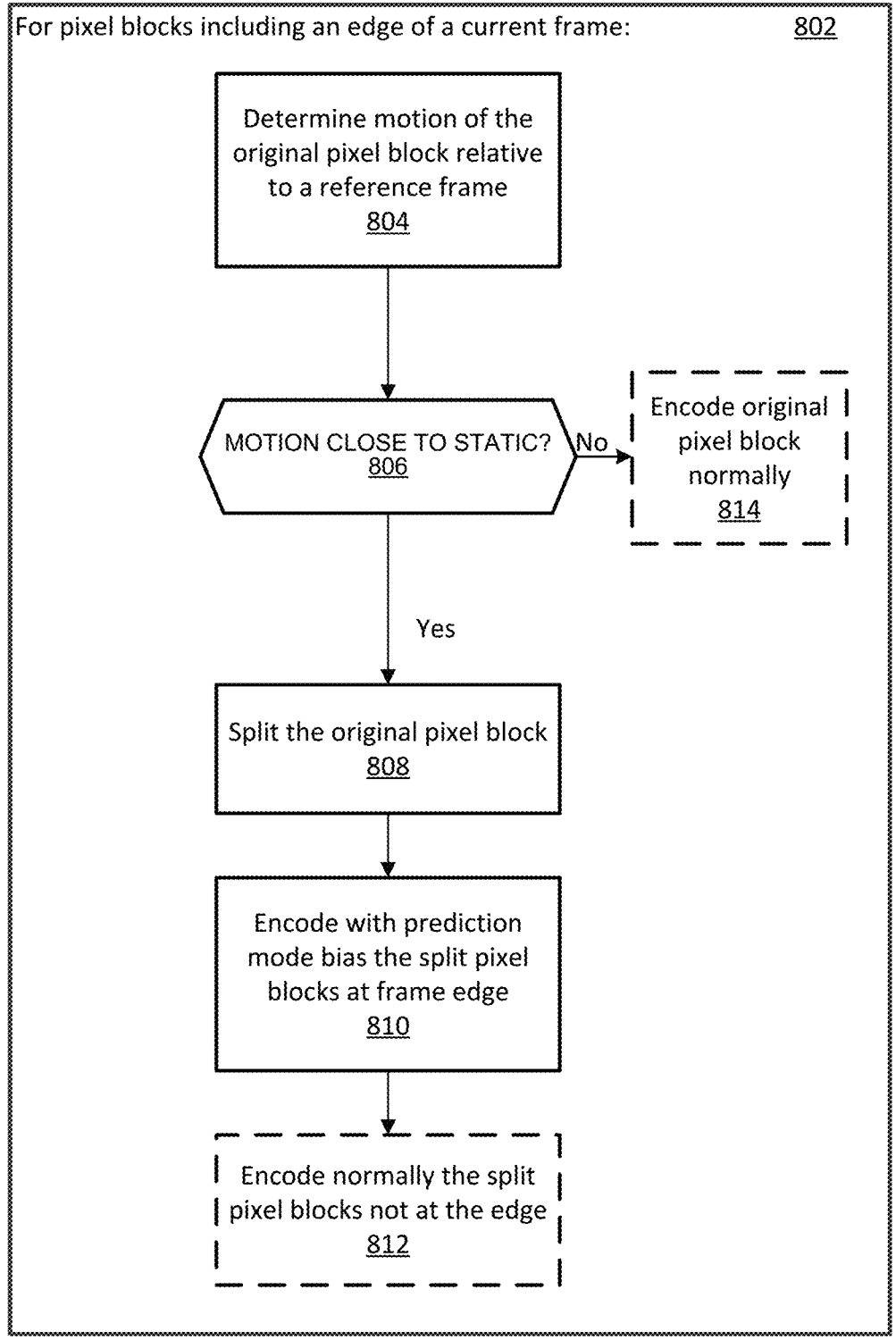
FIG. 8 illustrates a method for video coding according to an aspect of the present disclosure.

FIG. 8 is flowchart of an example method for improved video coding, and may be performed, for example, by the terminal 310 of FIG. 3(b). Optional operations are indicated in dashed boxes, including 814 and 812. For pixel blocks that include pixels at an edge of a current frame (802), a predictor, such as predictor 346, may determine a motion of the original pixel block relative to a reference frame (804). If the determined motion is not close to static (806), for example if there is no estimated motion or the estimated motion is large relative to the size of the pixel block, a coder, such as coder 342, may code the original pixel block normally (814) without splitting and without bias in selection of motion coding modes. If motion of the pixel block is determined to be close to static (806), the original pixel block may be split into multiple smaller pixel blocks (808). The coder may then encode the split pixel blocks at a frame edge with a bias in selecting a prediction mode (810). Alternately, split pixel blocks that are not at the frame edge may be encoded normally (812).

Motion of a pixel block in a current frame relative to a reference frame may be determined, for example, via motion estimation techniques. Splitting an original pixel block may result, for example, in some split pixel blocks that include a frame edge and some that do not include a frame edge. Encoding with a prediction mode bias may include, for example, selection of prediction mode with any of: a bias toward inter prediction mode; a bias toward intra prediction mode; a bias toward a prediction mode that includes encoded residual data; a bias away from skip mode; or a rule precluding use of skip mode. Encoding normally may include encoding without a bias in prediction mode selection. In other aspects, the depicted order of operations of boxes 810 and 812 may be reversed or these operations may be performed in parallel.

Some aspects may be implemented, for example, using a non-transitory computer-readable storage medium or article which may store an instruction or a set of instructions that, if executed by a processor, may cause the processor to perform a method in accordance with the disclosed aspects. Controller 348 of FIG. 3(b) may be an example of such a processor. The exemplary methods and computer program instructions may be embodied on a non-transitory machine readable storage medium. In addition, a server or database server may include machine readable media configured to store machine executable program instructions. The features of the aspects of the present invention may be implemented in hardware, software, firmware, or a combination thereof and utilized in systems, subsystems, components or subcomponents thereof. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some aspects, variations within the scope and spirit of the invention will be apparent to those of ordinary skill in the art. Thus, the invention should be considered as limited only by the scope of the appended claims.

We claim:

1. A video encoding method, comprising:
when a skip mode prediction is selected as a coding mode for an input pixel block of a frame to be coded by motion prediction:
   determining a portion of a reference frame to be used as a prediction reference for the input pixel block according to a motion vector derived according to the skip mode prediction;
   determining an amount of the portion that extends beyond an edge of the reference frame;
   when the amount does not exceed a threshold, coding the input pixel block according to the skip mode prediction including predicting the input pixel block as an integral unit with the motion vector derived according to the skip mode prediction; and
   when the amount exceeds the threshold:
      partitioning the input pixel block into a plurality of smaller pixel blocks; and
      coding the plurality of smaller pixel blocks with motion prediction including predicting the plurality of smaller pixel block with a corresponding motion vector for each of the smaller pixel blocks.

2. The method of claim 1, wherein at least one of the plurality of smaller pixel blocks is coded with a bias in the selection of a motion prediction coding mode toward a non-skip mode.

3. The method of claim 2, wherein the bias toward a motion prediction coding mode that includes coded residual data is one of:
   a bias toward inter prediction mode;
   a bias toward intra prediction mode;
   a bias toward a prediction mode that includes encoding prediction residual data;
   a bias away from skip mode; or
   a rule precluding use of skip mode.

4. The method of claim 2, wherein the plurality of smaller pixel blocks includes at least one smaller pixel block that is at a frame edge and at least one smaller pixel block that does not include the frame edge.

5. The method of claim 4, further comprising:
encoding the at least one smaller pixel block at the frame edge without a motion prediction coding mode bias.

6. The method of claim 4, further comprising:
encoding the at least one smaller pixel block not at the frame edge in skip mode.

7. A motion-compensation predictor for video data, comprising:
   a predictor operable according to a plurality of coding modes including a skip mode prediction,
   a pixel block coder having an input for pixel blocks of video data, and pixel blocks of reference pictures selected by the predictor, and
   a controller for controlling the predictor when the predictor selects the skip mode prediction as a coding mode for an input pixel block of a frame to be coded by motion prediction, by:
      estimating a portion of a reference frame to be used as a prediction reference for the input pixel block according to a motion vector derived for the input pixel block as an integral unit according to the skip mode prediction;
      determining an amount of the portion that extends beyond an edge of the reference frame;
      when the amount does not exceed a threshold, coding the input pixel block according to the skip mode prediction including predicting the input pixel block as an integral unit with the motion vector; and
      when the amount exceeds the threshold, partitioning the input pixel block into a plurality of smaller pixel blocks, and coding the plurality of smaller pixel blocks with motion prediction.

8. The motion-compensation predictor of claim 7, wherein at least one of the plurality of smaller pixel blocks is coded with a bias in the selection of a motion prediction coding mode toward a non-skip mode.

9. The motion-compensation predictor of claim 8, wherein the bias toward a motion prediction coding mode that includes coded residual data is one of:
   a bias toward inter prediction mode;
   a bias toward intra prediction mode;
   a bias toward a prediction mode that includes encoding prediction residual data;
   a bias away from skip mode; or
   a rule precluding use of skip mode.

10. The motion-compensation predictor of claim 8, wherein the plurality of smaller pixel blocks includes at least one smaller pixel block that is at a frame edge and at least one smaller pixel block that does not include the frame edge.

11. The motion-compensation predictor of claim 10, wherein:
the at least one smaller pixel block at the frame edge is coded without a motion prediction coding mode bias.

12. The motion-compensation predictor of claim 10, wherein:
the at least one smaller pixel block not at the frame edge is coded in skip mode.

13. The motion-compensation predictor of claim 7, wherein each of the plurality of smaller pixel blocks are coded with a bias in the selection of a motion prediction coding mode.

14. A non-transitory computer readable medium including instructions that, when executed by a processor, cause:
when a skip mode prediction is selected as a coding mode for an input pixel block of a frame to be coded by motion prediction:
   estimating a portion of a reference frame to be used as a prediction reference for the input pixel block according to a motion vector derived for the input pixel block as an integral unit according to the skip mode prediction;
   determining an amount of the portion that extends beyond an edge of the reference frame;
   when the amount does not exceed a threshold, coding the input pixel block according to the skip mode prediction including predicting the input pixel block as an integral unit with the motion vector; and
   when the amount exceeds the threshold:
      partitioning the input pixel block into a plurality of smaller pixel blocks; and;
      coding the plurality of smaller pixel blocks with motion prediction.

15. The medium of claim 14, wherein at least one of the plurality of smaller pixel blocks is coded with a bias in the selection of a motion prediction coding mode toward a non-skip mode.

16. The medium of claim 15, wherein the bias toward a motion prediction coding mode that includes coded residual data is one of:
- a bias toward inter prediction mode;
- a bias toward intra prediction mode;
- a bias toward a prediction mode that includes encoding prediction residual data;
- a bias away from skip mode; or
- a rule precluding use of skip mode.

17. The medium of claim 15, wherein the plurality of smaller pixel blocks includes at least one smaller pixel block that is at a frame edge and at least one smaller pixel block that does not include the frame edge.

18. The medium of claim 17, wherein the instructions further cause:
- encoding the at least one smaller pixel block at the frame edge without a motion prediction coding mode bias.

19. The medium of claim 17, wherein the instructions further cause:
- encoding the at least one smaller pixel block not at the frame edge in skip mode.

20. The medium of claim 17, wherein each of the plurality of smaller pixel blocks are coded with a bias in the selection of a motion prediction coding mode.

21. The method of claim 1, wherein:
- the skip mode prediction for a current pixel block includes inferring a motion vector for the predicting the current pixel block from one or more motion vectors explicitly signaled for other pixel blocks in the coded output, and a motion vector is not explicitly signaled for the current pixel block in the coded output.

22. The method of claim 1, wherein, when the amount of the portion extending beyond the edge of the reference frame exceeds the threshold:
- the plurality of partitioned smaller pixel block includes
  - a first subset of the smaller pixel blocks corresponding to the portion that extends beyond the edge of the reference frame, and
  - a second subset of the smaller pixel blocks corresponding to the portion that does not extend beyond edge; and
- the coding of the plurality of smaller pixel blocks includes
  - coding the first subset of the smaller pixel blocks with a bias against skip mode prediction, and
  - coding the second subset of the smaller pixel blocks without a bias against skip mode prediction.

* * * * *